US00RE34000E

United States Patent [19]

Syka et al.

[11] E Patent Number: Re. 34,000

[45] Reissued Date of Patent: Jul. 21, 1992

[54] METHOD OF OPERATING ION TRAP DETECTOR IN MS/MS MODE

[75] Inventors: John E. P. Syka, Sunnyvale; John N. Louris, Santa Clara; Paul E. Kelley; George C. Stafford, both of San Jose; Walter E. Reynolds, Woodside, all of Calif.

[73] Assignee: Finnigan Corporation, San Jose, Calif.

[21] Appl. No.: 499,947

[22] Filed: Mar. 27, 1990

Related U.S. Patent Documents

Reissue of:

[64] Patent No.: 4,736,101
Issued: Apr. 5, 1988
Appl. No.: 84,518
Filed: Aug. 11, 1987

U.S. Applications:

[63] Continuation of Ser. No. 738,018, May 24, 1985.

[51] Int. Cl.[5] ..... H01J 49/42

[52] U.S. Cl. ..... 250/292; 250/290; 250/282

[58] Field of Search ..... 250/292, 291, 290, 282

[56] References Cited

U.S. PATENT DOCUMENTS

| | | | |
|---|---|---|---|
| 2,939,952 | 6/1960 | Paul et al. | 250/292 |
| 3,527,949 | 9/1970 | Dawson et al. | 250/292 |
| 4,105,917 | 8/1978 | McIver et al. | 250/291 |
| 4,540,884 | 9/1985 | Stafford et al. | 250/282 |

OTHER PUBLICATIONS

Fulford et al., *Journal of Vacuum Science and Technology*, 17(4) Jul./Aug. 1980, pp. 829-835.

Mather et al., *Dynamic Mass Spectrometry*, vol. 5, ed. Price et al., 1978, pp. 71-84.

Todd et al., "Quadrupole Ion Traps", *Quadrupole Mass Spectrometry and its Applications*, ed. Dawson, 1976, pp. 181-224.

Dawson, *Quadrupole Mass Spectromety and its Applications*, 1976, pp. 4-6.

Rettinghaus Z. Angew Phys. 22 (1967), pp. 321-326.

Fischer, Z. Phys. 156 (1959), pp. 1-26.

*Primary Examiner*—Jack I. Berman

*Attorney, Agent, or Firm*—Flehr, Hohbach, Test, Albritton & Herbert

[57] ABSTRACT

A simple and economical method of mass analyzing a sample by means of a quadrupole ion trap mass spectrometer in an MS/MS mode comprises the steps of forming ions within a trap structure, changing the RF and DC voltages in such a way that the ions with mass-to-charge ratios within a desired range will be and remain trapped within the trap structure, dissociating such ions into fragments by collisions and increasing the field intensity again so that the generated fragments will become unstable and exit the trap volume sequentially to be detected. A supplementary AC field may be applied additionally to provide various scan modes as well as dissociate the ions.

19 Claims, 7 Drawing Sheets

METHOD OF OPERATING ION TRAP DETECTOR IN MS/MS MODE

Matter enclosed in heavy brackets [ ] appears in the original patent but forms no part of this reissue specification; matter printed in italics indicates the additions made by reissue.

This is a continuation of application Ser. No. 738,018 filed May 24, 1985.

The present invention relates to a method of using an ion trap in an MS/MS mode.

Ion trap mass spectrometers, or quadrupole ion stores, have been known for many years and described by a number of authors. They are devices in which ions are formed and contained within a physical structure by means of electrostatic fields such as RF, DC and a combination thereof. In general, a quadrupole electric field provides an ion storage region by the use of a hyperbolic electrode structure or a spherical electrode structure which provides an equivalent quadrupole trapping field.

Mass storage is generally achieved by operating trap electrodes with values of RF voltage V and its frequency f, DC voltage U and device size $r_0$ such that ions having their mass-to-charge ratios within a finite range are stably trapped inside the device. The aforementioned parameters are sometimes referred to as scanning parameters and have a fixed relationship to the mass-to-charge ratios of the trapped ions. For trapped ions, there is a distinctive secular frequency for each value of mass-to-charge ratio. In one method for detection of the ions, these secular frequencies can be determined by a frequency tuned circuit which coupled to the oscillating motion of the ions within the trap, and then the mass-to-charge ratio may be determined by use of an improved analyzing technique.

In spite of the relative length of time during which ion trap mass spectrometers and methods of using them for mass analyzing a sample have been known they have not gained popularity until recently because these mass selection techniques are insufficient and difficult to implement and yield poor mass resolution and limited mass range. A new method of ion trap operation (U.S. Pat. No. 2,939,952 and U.S. patent application Ser. No. 453,351 12- 2982) has overcome most of the past limitations an is gaining popularity as a product called the Ion Trap Detector.

It is an object of this invention to provide a new method of operating an ion trap in a mode of operation called MS/MS.

In accordance with the above object there is provided a new method of using an ion trap in an MS/MS mode which comprises the steps of forming and storing ions in the ion trap, mass-selecting them by a mass analyzer, dissociating them by means of collisions with a gas or surfaces, and analyzing fragment ions by means of a mass or energy analyzer. *A supplementary AC field may be applied additionally to provide various scan modes for mass detection as well as to dissociate the ions.*

Figure 3A:
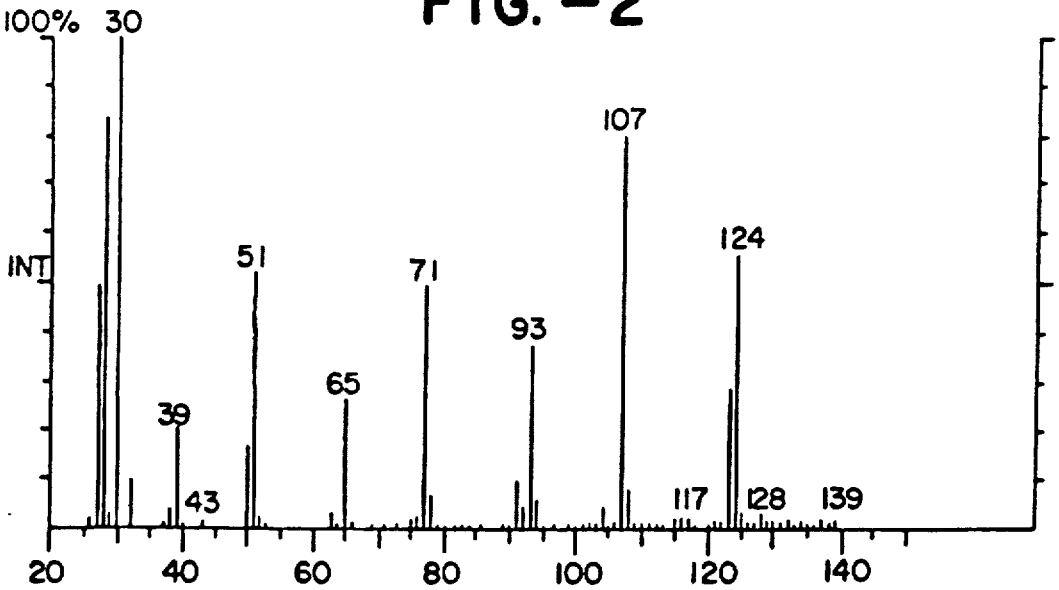
Figure 3B:
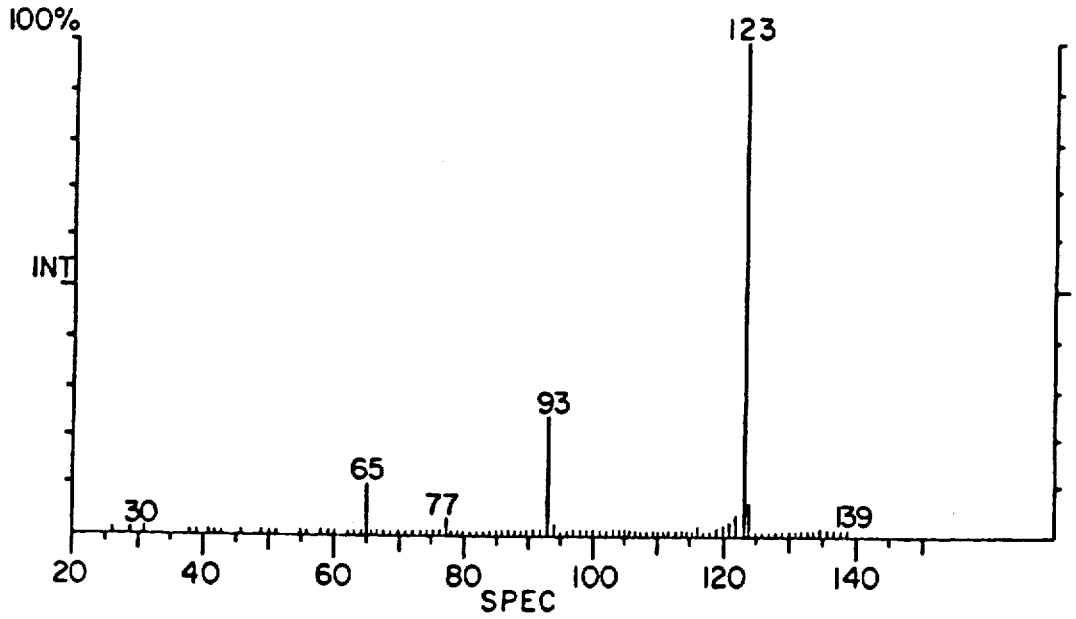

FIGS 3(A) and 3(B) are spectrograms obtained by a series of experiments with a nitrobenzene sample by using the method of the present invention.

Figure 4:
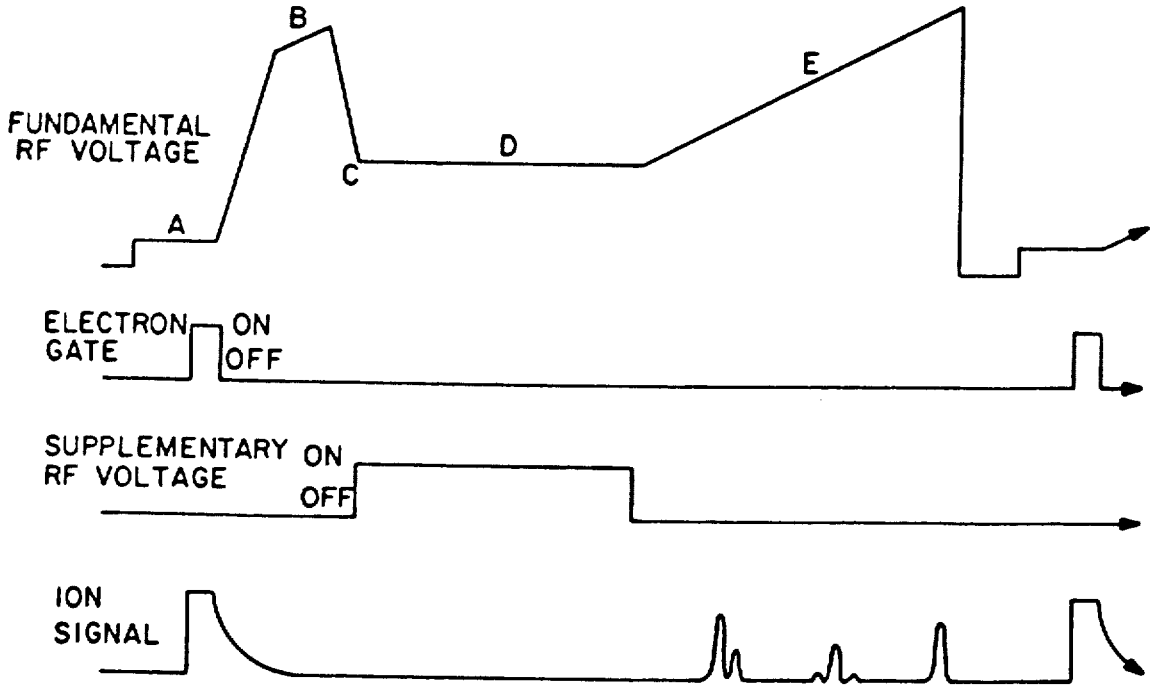

FIG. 4 shows a program that may be used for a notchfilter scan mode with a supplementary voltage.

Figure 5A:
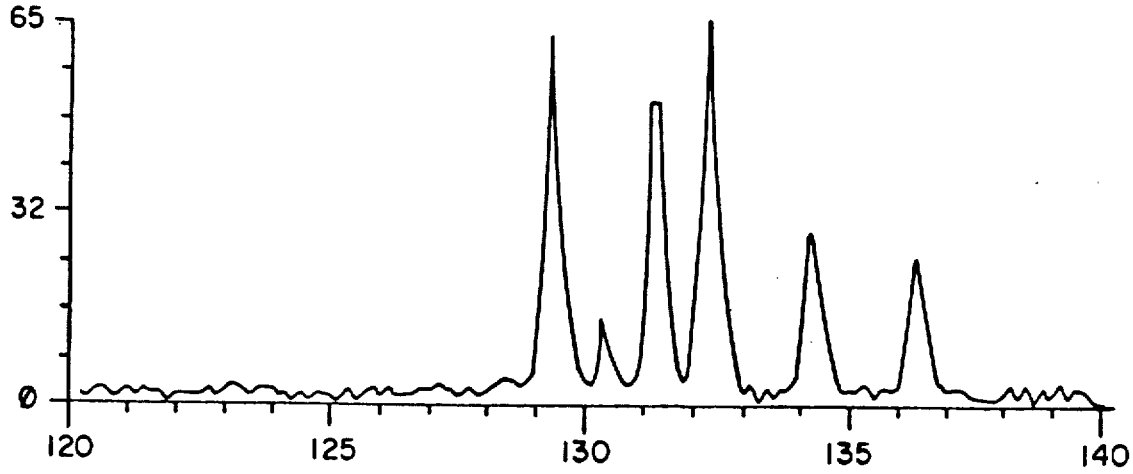
Figure 5B:
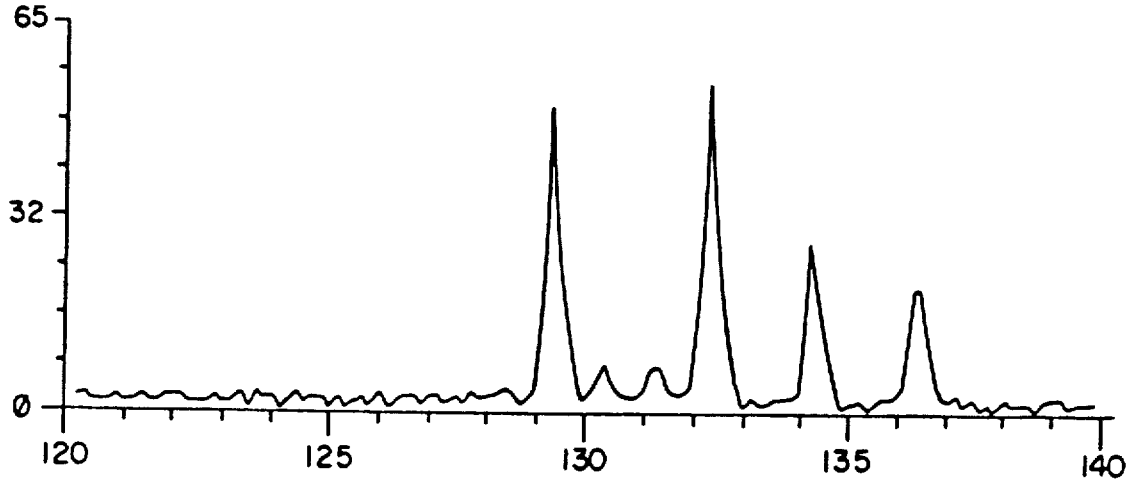

FIGS. 5(A) and 5(B) are spectrograms obtained with a xenon sample by using the method of FIG. 4.

FIG. 6(A) through FIG. 6(D) are spectrograms obtained with a nitrobenzene sample by using the method of FIG. 4.

Figure 7:
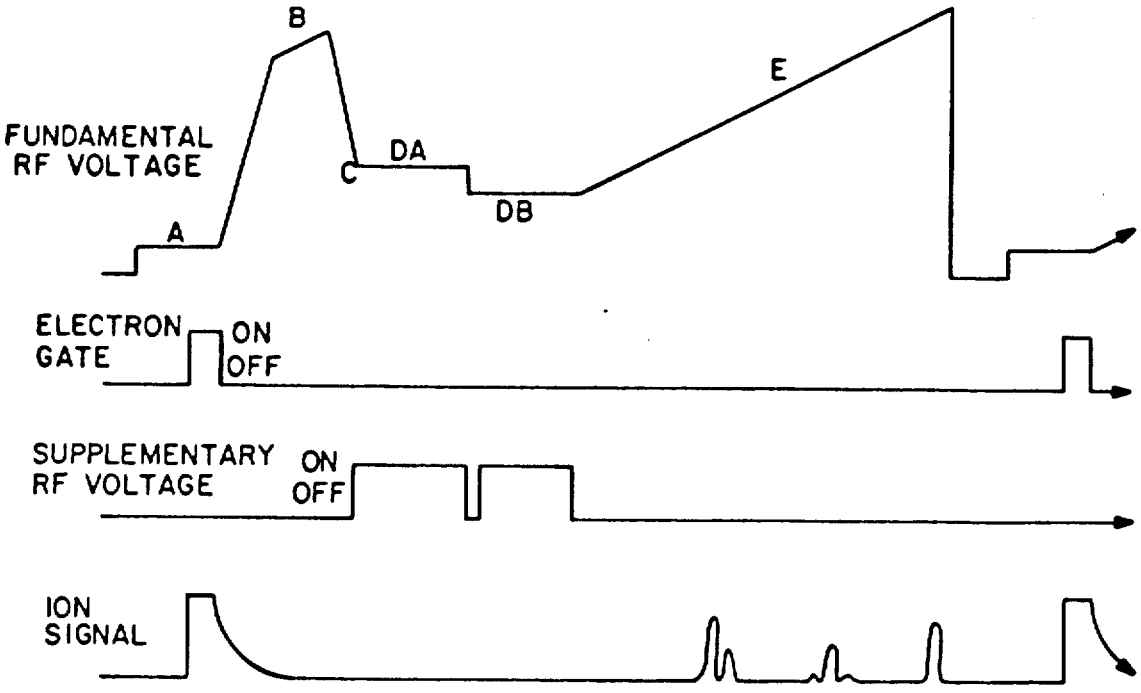

FIG. 7 shows another program for an ion scan mode of the present invention.

FIG. 8(A) through FIG. 8(D) are spectrograms obtained with an n-heptane sample by a series of experiments in which both the methods of FIGS. 4 and 7 are used.

Figure 1:
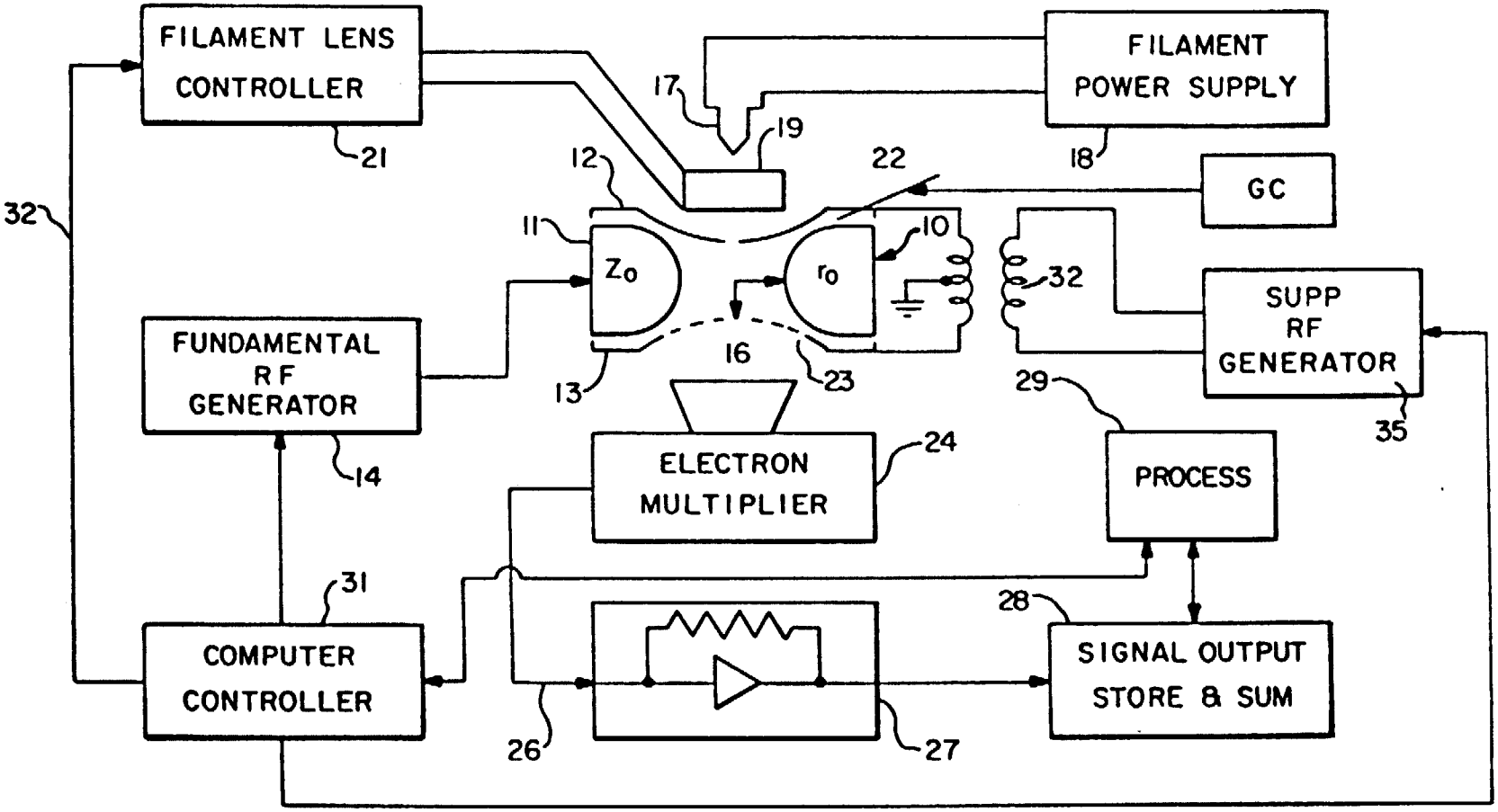
FIG. 1 is a simplified schematic of a quadrupole ion trap along with a block diagram of associated electrical circuits adapted to be used according to the method embodying the present invention.

There is shown in FIG. 1 at 10 a three-dimensional ion trap which includes a ring electrode 11 and two end caps 12 and 13 facing each other. A radio frequency voltage generator 14 is connected to the ring electrode 11 to supply a radio frequency voltage V sin $\omega t$ (the fundamental voltage) between the end caps and the ring electrode which provides the quadrupole field for trapping ions within the ion storage region or volume 16 having a radius $r_0$ and a vertical dimension $z_0$ ($z_0^2 = r_0^2/2$). The field required for trapping is formed by coupling the RF voltage between the ring electrode 11 and the two end cap electrodes 12 and 13 which are common mode grounded through coupling transformer 32 as shown. A supplementary RF generator 35 is coupled to the end caps 22, 23 to supply a radio frequency voltage $V_2$ sin $\omega_2 t$ between the end caps to resonate trapped ions at their axial resonant frequencies. A filament 17 which is fed by a filament power supply 18 is disposed to provide an ionizing electron beam for ionizing the sample molecules introduced into the ion storage region 16. A cylindrical gate electrode and lens 19 is powered by a filament lens controller 21. The gate electrode provides control to gate the electron beam on and off as desired. End cap 12 includes an aperture through which the electron beam projects. The opposite end cap 13 is perforated 23 to allow unstable ions in the fields of the ion trap to exit and be detected by an electron multiplier 24 which generates an ion signal on line 26. An electrometer 27 converts the signal on line 26 from current to voltage. The signal is summed and stored by the unit 28 and processed in unit 29. Controller 31 is connected to the fundamental RF generator 14 to allow the magnitude and/or frequency of the fundamental RF voltage to be varied for providing mass selection. The controller 31 is also connected to the supplementary RF generator 35 to allow the magnitude and/or frequency of the supplementary RF voltage to be varied or gated. The controller on line 32 gates the filament lens controller 21 to provide an ionizing electron beam only at time periods other than the scanning interval. Mechanical details of ion traps have been shown, for example, U.S. Pat. No. 2,939,952 and more recently in U.S. patent application Ser. No. 454,351 12/29/82 assigned to the present assignee.

Figure 2:
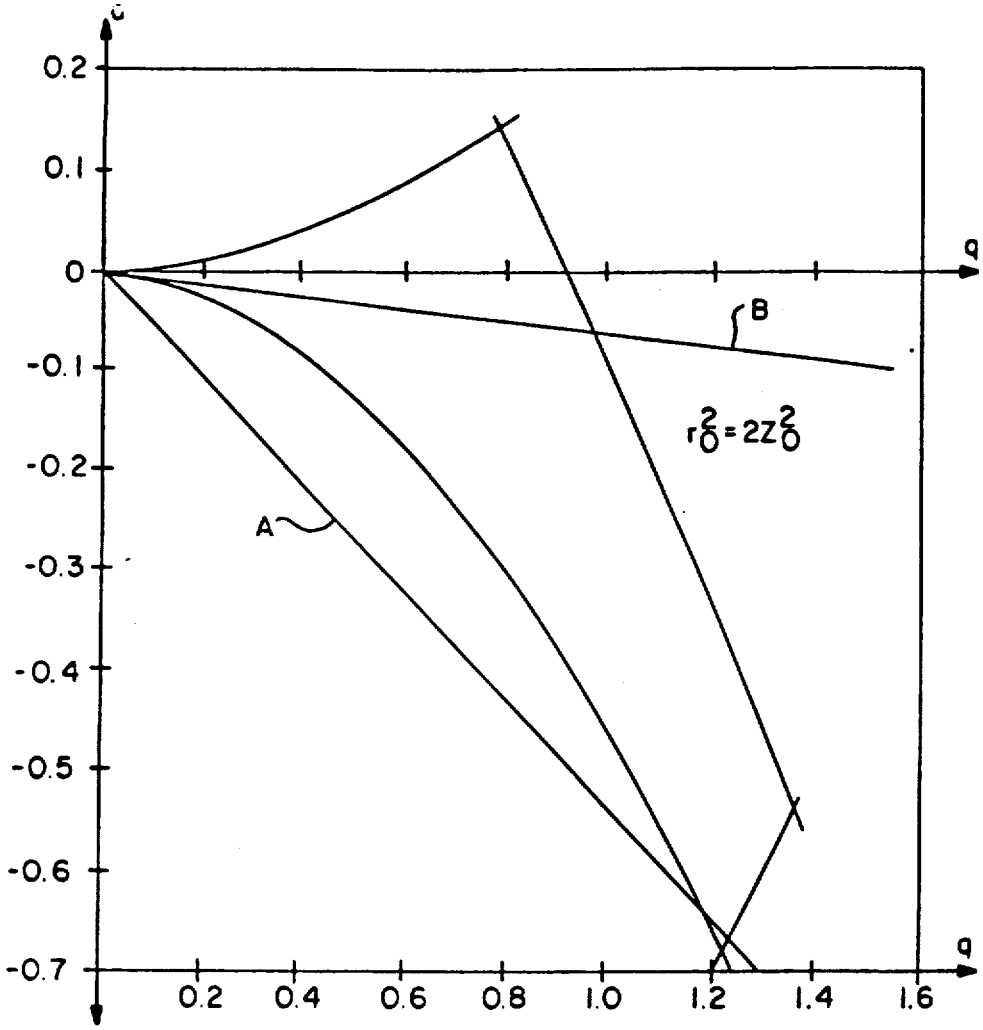
FIG. 2 is a stability envelope for an ion store device of the type shown in FIG. 1.

The symmetric fields in the ion trap 10 lead to the well known stability diagram shown in FIG. 2. The parameters a and q in FIG. 2 are defined as $$a = -8\, eU/mr_0^2\omega^2$$

$$q = 4\, eV/mr_0^2\omega^2$$

where e and m are respectively charge on and mass of charged particle. For any particular ion, the values of a and q must be within the stability envelope if it is to be trapped within the quadrupole fields of the ion trap device.

The type of trajectory a charged particle has in a described three-dimensional quadrupole field depends on how the specific mass of the particle, m/e, and the applied field parameters, U, V, $r_0$ and $\omega$ combined to map onto the stability diagram. If the scanning parameters combine to map inside the stability envelope then the given particle has a stable trajectory in the defined field. A charged particle having a stable trajectory in a three-dimensional quadrupole field is constrained to a periodic orbit about the center of the field. Such particles can be thought of as trapped by the field. If for a particle m/e, U, V, $r_0$ and $\omega$ combine to map outside the stability envelope on the stability diagram, then the given particle has an unstable trajectory in the defined field. Particles having unstable trajectories in a three-dimensional quadrupole field obtain displacements from the center of the field which approach infinity over time. Such particles can be thought of escaping the field and are consequently considered untrappable.

For a three-dimensional quadrupole field defined by U, V, $r_0$ and $\omega$, the locus of all possible mass-to-charge ratios maps onto the stability diagram as a single straight line running through the origin with a slope equal to $-2$ U/V. (This locus is also referred to as the scan line.) That portion of the loci of all possible mass-to-charge ratios that maps within the stability region defines the region of mass-to-charge ratios particles may have if they are to be trapped in the applied field. By properly choosing the magnitude of U and V, the range of specific masses to trappable particles can be selected. If the ratio of U to V is chosen so that the locus of possible specific masses maps through an apex of the stability region (line A of FIG. 2) then only particles within a very narrow range of specific masses will have stable trajectories. However, if the ratio of U to V is chosen so that the locus of possible specific masses maps through the middle of the stability region (line B of FIG. 2) then particles of a broad range of specific masses will have stable trajectories.

According to the present invention, the ion trap of the type described above is operated as follows: ions are formed within the trap volume 16 by gating a burst of electrons from the filament 17 into the trap. The DC and RF voltages are applied to the three-dimensional electrode structure such that ions of a desired mass or mass range will be stable while all others will be unstable and expelled from the trap structure. This step may be carried out by using only the RF potential so that the trapped ions will lie on a horizontal line through the origin in the stability diagram of FIG. 2 (a=0). The electron beam is then shut off and the trapping voltages are reduced until U becomes 0 in such a way that the loci of all stably trapped ions will stay inside the stability region in the stability diagram throughout this process. The value of q must be reduced sufficiently low so that not only the ions of interest but any fragment ions which are formed therefrom in a subsequent dissociation process to be described below will also remain trapped (because a lower mass-to-charge ratio means a large q value).

In the dissociation step, the ions of interest are caused to collide with a gas so as to become dissociated into fragments which will remain within the trap, or within the stability region of FIG. 2. Since the ions to be fragmented may or may not have sufficient energy to undergo fragmentation by colliding with a gas, it may be necessary to pump energy into the ions of interest or to cause them to collide with energetic or excited neutral species so that the system will contain enough energy to cause fragmentation of the ions of interest. The fragment ions are then swept from the trap by the RF voltage along the horizontal line a=0 in FIG. 2 so as to be detected.

Any of the known ways of producing energetic neutral species may be used in the preceding step. Excited neutrals of argon or xenon may be introduced from a gun, pulsed at a proper time. A discharge source may be used alternatively. A laser pulse may be used to pump energy into the system, either through the ions or through the neutral species.

In what follows, there will be shown results of experiment for determining in the case of nitrobenzene ions (with molecular weight M=123 and degree of ionization Z=1) what fragment ions (daughter ions), what fragment ions of fragment ions (granddaughter ions), etc. will arise when dissociation of the parent ions is induced by collisions with a background gas such as argon and the resultant ions out of the ion trap are scanned to determine their mass spectrum.

FIG. 3(A) is an electron ionization mass spectrogram of nitrobenzene. Line M/Z=124 arises from an ion-molecule reaction which adds a proton to M/Z=123.

Operating in the mode with U=0 and with $1\times10^4$ torr of Ar, the RF voltage was adjusted first such that only ions with M/Z greater than 120 would be stored in the ion trap at the end of sample ionization. The RF voltage was then lowered such that the cut-off value would be M/Z=20 so that ions with M/Z above this value would be trapped or stable in the ion trap. Parent ions with M/Z=123 which remained trapped in the ion trap after ionization collided with a background gas of argon and dissociated. Next the RF was scanned up and the mass spectrogram shown in FIG. 3(B) was obtained, representing the ions produced from the parent with M/Z=123.

A variety of new scan modes becomes possible with the superposition of an AC field such as an RF field. For any ion stored in the ion trap, the displacement in any space coordinate must be a composite of periodic function of time. If a supplementary RF potential is applied that matches any of the component frequencies of the motion for a particular ion species, that ion will begin to oscillate along the coordinate with increased amplitude. The ion may be ejected from the trap, strike an electrode, or in the presence of significant pressure of sample or inert damping gas may assume a stable trajectory within the trap of mean displacement greater than before the application of the supplementary RF potential. If the supplementary RF potential is applied for a limited time, the ion may assume a stable orbit, even under conditions of low pressure.

FIG. 4 illustrates a program that may be used for a notch-filter mode. Reference being made to this figure, ions of the mass range of interest are produced and stored in period A, and then the fundamental RF voltage applied to the ring electrode is increased to eject all ions of M/Z less than a given value. The fundamental RF voltage is then maintained at a fixed level which will trap all ions of M/Z greater than another given value (period D). A supplementary RF voltage of appropriate frequency and magnitude is then applied between the end caps and all ions of a particular M/Z value are ejected from the trap. The supplementary voltage is then turned off and the fundamental RF voltage is scanned to obtain a mass spectrum of the ions that are still in the trap (period E).

FIG. 5(A) shows a spectrum of xenon in which the fundamental RF voltage is scanned as in FIG. 4 but in which a supplementary voltage is not used. FIG. 5(B) shows a spectrum obtained under similar conditions but a supplementary voltage of appropriate frequency and magnitude is used to eject ions of M/Z=131 during period D. FIG. 5(B) shows that these ions are largely removed from the trap. There are many ways of actually using the notch-filter mode. For example, the supplementary RF voltage might be turned on during the ionization period and turned off at all other times. An ion which is present in a large amount would be ejected to facilitate the study of ions which are present in lesser amounts.

Other useful scan modes are possible by using the supplementary field during periods in which the fundamental RF voltage or its associated DC component is scanned rather than maintained at a constant level. For example, if a supplementary voltage of sufficient amplitude and fixed frequency is turned on during period E (instead of during period D), ions will be successively ejected from the trap as the fundamental RF voltage successively produces a resonant frequency in each ion species which matches the frequency of the supplementary voltage. In this way, a mass spectrum over a specified range of M/Z values can be obtained with a reduced maximum magnitude of the fundamental RF voltage or a larger maximum M/Z value may be attained for a given maximum magnitude of the fundamental RF voltage. Since the maximum attainable value of the fundamental RF voltage limits the mass range in the ordinary scan mode, the supplementary RF voltage extends the mass range of the instrument.

Useful scan modes are also possible in which the frequency of the supplementary voltage is scanned. For example, the frequency of the supplementary voltage may be scanned while the fundamental RF voltage is fixed. This would correspond to FIG. 4 with period E absent and the frequency of the supplementary RF voltage being scanned during period D. A mass spectrum is obtained as ions are successively brought into resonance. Increased mass resolution is possible in this mode of operation. Also, an extended mass range is attainable because the fundamental RF voltage is fixed.

Figure 6A:
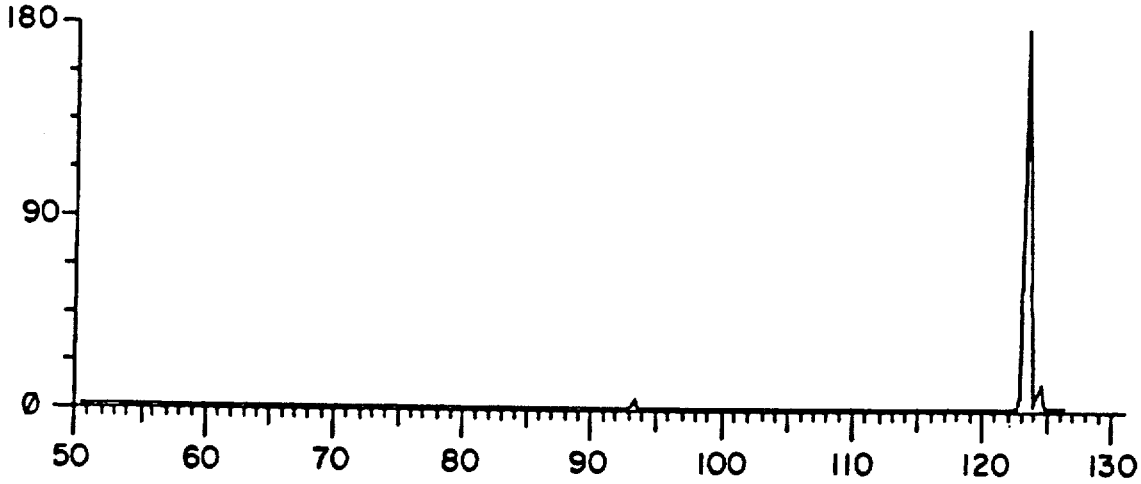
Figure 6B:
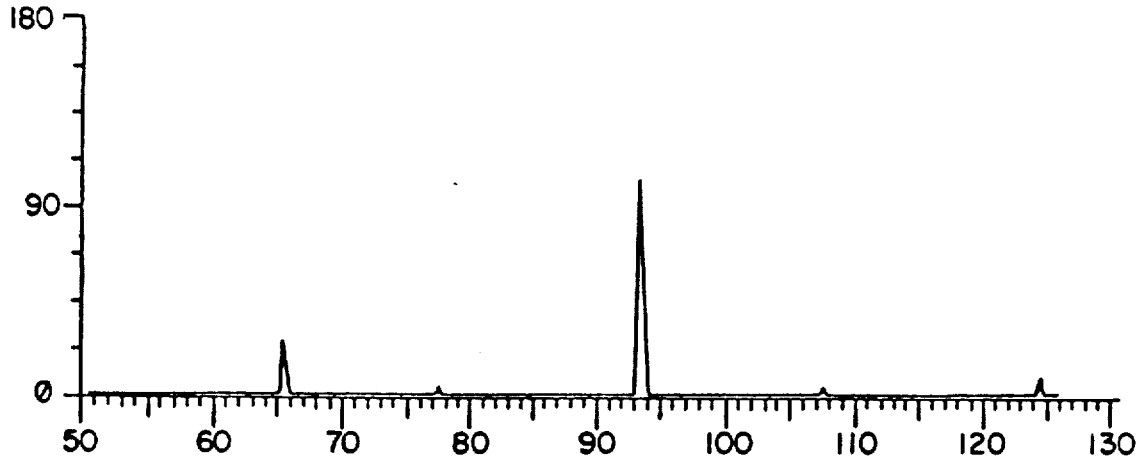
Figure 6C:
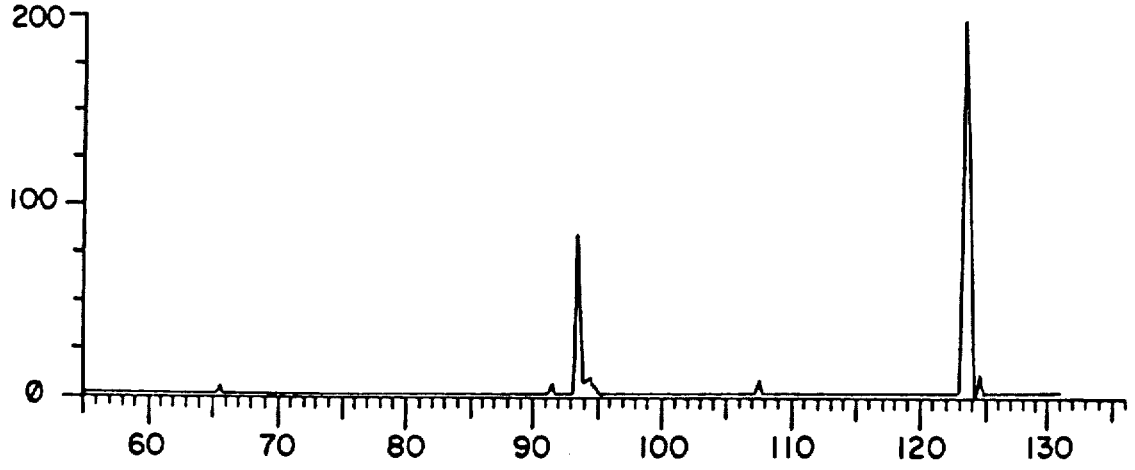
Figure 6D:
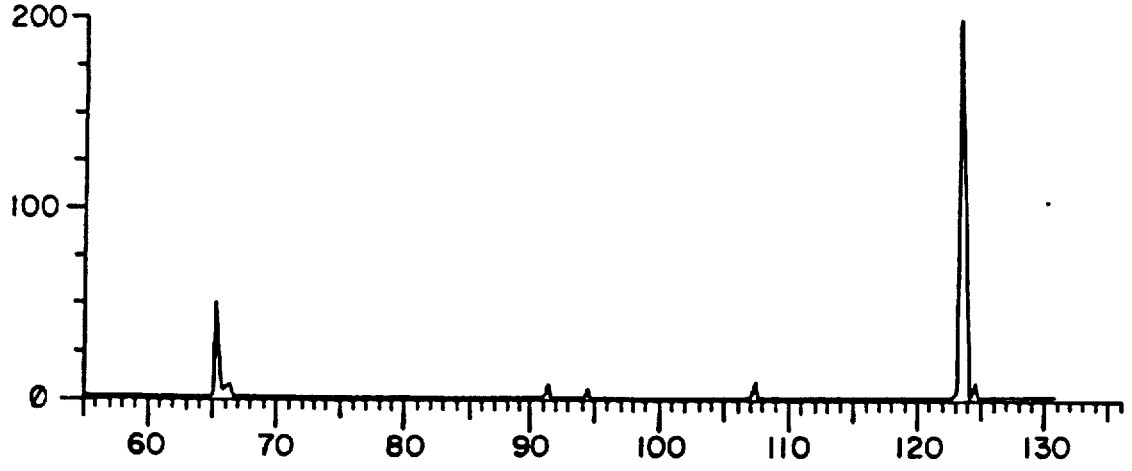

The presence of a supplementary RF voltage may induce fragmentation of ions at or near resonance. FIG. 6(A) shows a spectrum of nitrobenzene (with $1\times10^{-3}$ torr He) acquired with the scan program of FIG. 4 but without a supplementary RF voltage. All ions of M/Z less than 118 are ejected before and during period B so that the small peak at M/Z=93 must have been formed after period B and before the ejection of ions of M/Z=93 during period E FIG. 6(B) shows a spectrum obtained under the same conditions except that a supplementary RF voltage at the resonant frequency of M/Z=123 was applied during interval D. The spectrum shows abundant fragment ions at M/Z=93 and 65. Similarly, FIG. 6(C) was acquired as was FIG. 6(A), except that all ions of M/Z less than 88 are ejected before and during period B. FIG. 6(D) was acquired under the same conditions as FIG. 6(C), except that a supplementary RF voltage at the resonant frequency of M/Z=93 was applied during interval D. This spectrum shows an abundant fragment at M/Z=65.

Figure 8A:
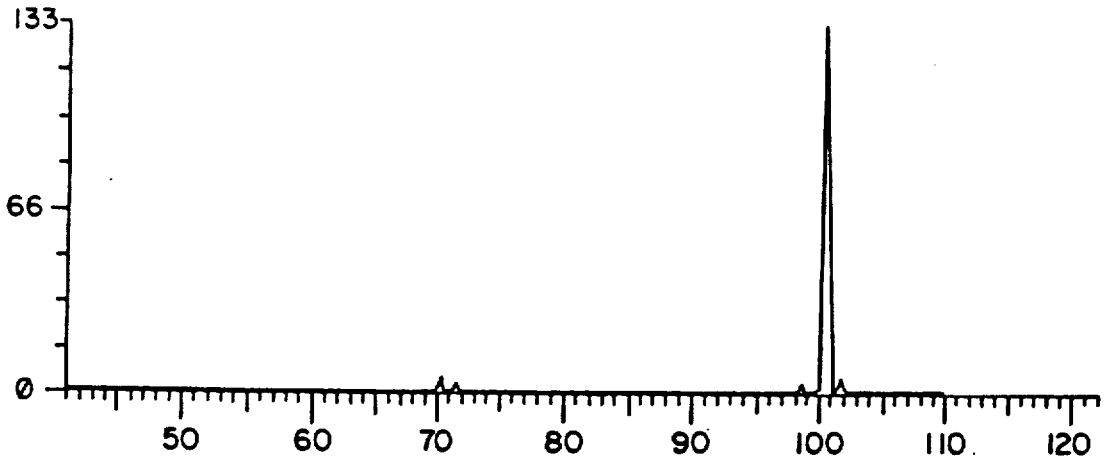
Figure 8B:
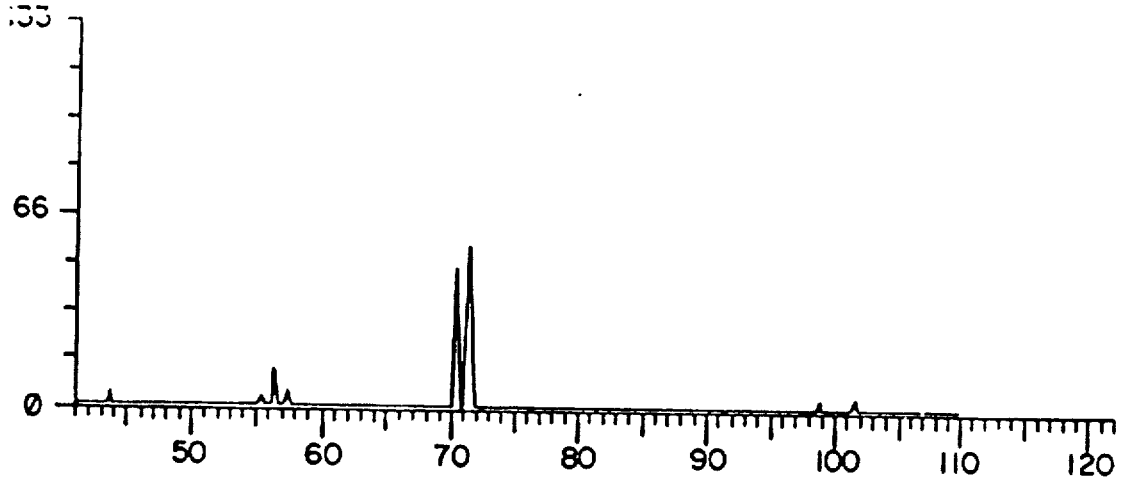
Figure 8C:
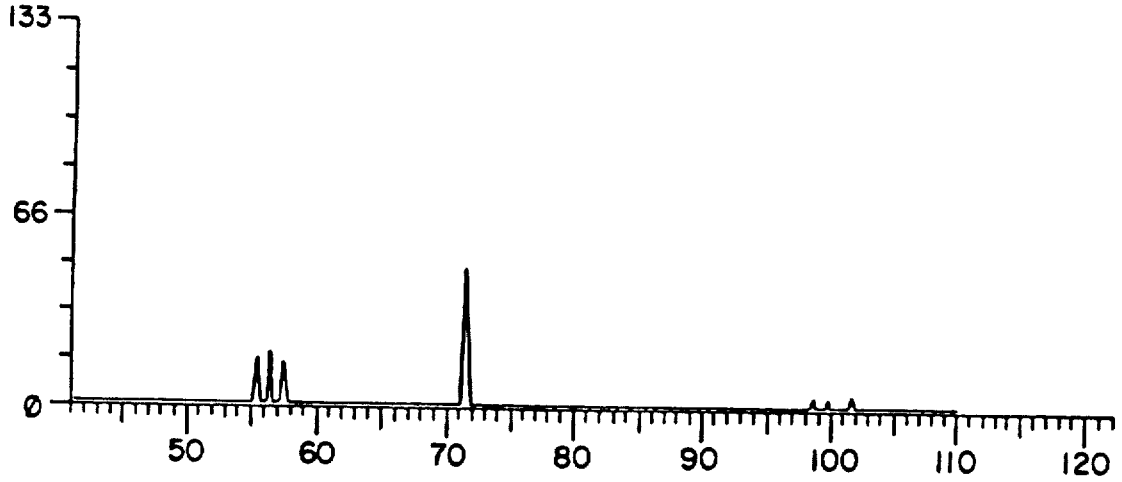
Figure 8D:
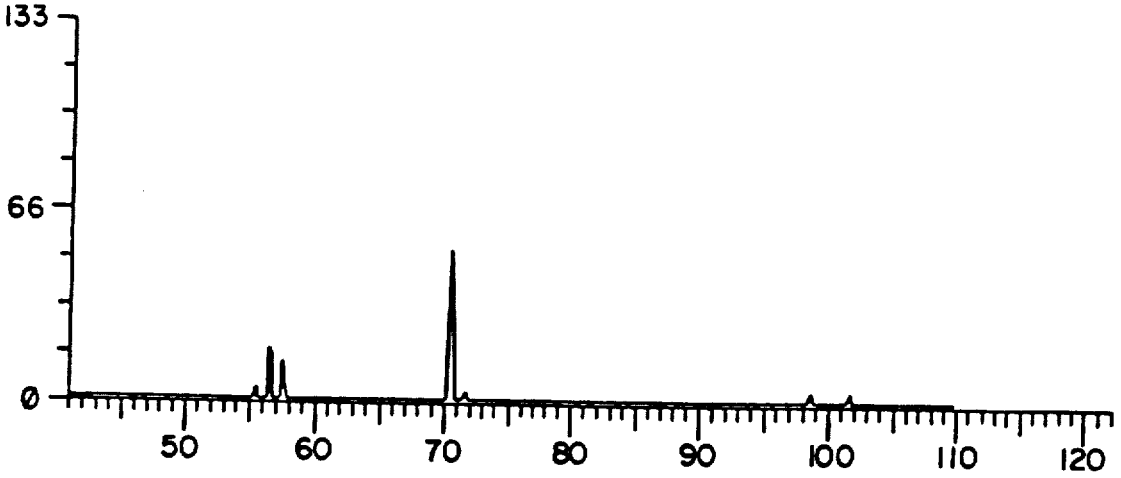

Sequential experiments are possible in which daughter ions are produced with the supplementary RF field and granddaughter ions are then produced from those daughter ions by adjusting the conditions such as voltage or frequency of the fundamental RF field or the supplementary RF field so that the daughter ions are brought into resonance. FIG. 7 shows a particular way in which daughter ions may be produced. The frequency of the supplementary RF voltage remains constant but the fundamental RF voltage is adjusted during period DA to bring a particular parent ion into resonance so that granddaughter ions are produced. During period DB, the fundamental RF voltage is adjusted to bring a particular daughter ion into resonance so that granddaughter ions will be produced. FIG. 8(A) shows a spectrum of n-heptane during the acquisition of which the scan program of FIG. 7 was used, except that no supplementary RF voltage was used. Since all ions of M/Z less than 95 were ejected before and during period B, the small peaks at M/Z=70 and 71 must be due to ions that were formed after period B. FIG. 8(B) was obtained by using the scan program shown in FIG. 4 with a supplementary frequency at the resonant frequency of M/Z=100. Abundant daughter ions at M/Z=70 and 71 are seen, and less intense peaks at M/Z=55, 56 and 57 are evident. FIG. 8(C) was acquired with the scan program used for FIG. 8(A), except that a supplementary RF voltage was used. The fundamental RF voltage during periods DA and DB, and the frequency of the supplementary RF voltage were chosen so that M/Z=100 was in resonance during period DA so that daughter ions were produced. A particular daughter was M/Z=70 that was produced during period DA was brought into resonance during period DB so that granddaughter ions were produced. These granddaughter ions are evident in FIG. 8(C) as the increased intensities of the peaks at M/Z=55, 56 and 57. FIG. 8(D) is similar to FIG. 8(A) except that M/Z=100 was in resonance during DA, and M/Z=71 was in resonance during DB.

Many other schemes may be used to obtain sequential daughter scans. For example, the frequency of the supplemental RF field may be changed instead of changing the fundamental RF voltage. Also, the trap may be cleared of undesired ions after daughter ions have been produced but before granddaughter ions are produced. Of course, further fragmentation may be induced by sequentially changing the fundamental RF voltage or the frequency of the supplementary RF voltage to bring the products of successive fragmentations into resonance.

The present invention has been disclosed above in terms of only a limited number of examples but various modifications which may be made thereon are still considered within the purview of the present invention. For example, the applied RF voltage need not be sinusoidal but is required only to be periodic. A different stability diagram will result but its general characteristics are similar, including a scan line. In other words, the RF voltage could comprise square waves, triangular waves, etc. The quadrupole ion trap would nevertheless operate in substantially the same manner. The ion trap sides were described above as hyperbolic but the ion traps can be formed with cylindrical or circular trap sides. Any electrode structure that produces an approximate three-dimensional quadrupole field could be used. The scope of the invention is limited only by the following claims.

What is claimed is:

1. A method of mass analyzing a sample comprising the steps of defining a trap volume with a three-dimensional quadrupole field adapted to trap ions within a predetermined range of mass-to-charge ratio, forming or injecting ions within said trap volume such that those within said predetermined mass-to-charge range are trapped within said trap volume, changing said quadrupole field to eliminate ions having a mass-to-charge ratio other than that of the ions of desired charge-to-mass ratio to be analyzed, readjusting said quadrupole field to capture daughter ions of said ions of desired charge-to-mass ratio dissociating or reacting said trapped desired ions such that those of said ions and said daughters within a desired range of mass-to-charge ratio remain trapped within said trap volume, and then charging the quadrupole field to cause ions of consecutive mass to escape said trap volume for detection.

2. The method of claim 1 wherein said quadrupole field is generated by an ion trap having a ring electrode and spaced end electrodes, said quadrupole field being defined by U = amplitude of a direct current voltage between said end electrodes and said ring electrode, V = magnitude of an RF voltage applied between said ring electrodes, and $\omega = 2\pi \times$ frequency of said RF voltage.

3. The method of claim 2 wherein said step of controlling said quadrupole field is effected by changing one or more of U, V and $\omega$.

4. The method of claim 3 wherein U is changed to 0.

5. The method of claim 1 wherein said step of forming ions is effected by gating a burst of electrons into said trap volume.

6. The method of claim 2 wherein said step of forming ions is effected with U = 0.

7. The method of claim 1 further comprising the step of pumping energy into said trapped ions.

8. The method of claim 1 further comprising the step of causing said trapped ions to collide with energetic background particles.

9. The method of claim 1 wherein said step of controlling said quadrupole field and dissociating said trapped ions includes the step of superposing a supplementary AC field.

10. The method of claim 9 wherein said supplementary field is turned on while the intensity of said quadrupole field is fixed.

11. The method of claim 9 wherein said quadrupole field and supplementary field are controlled such that during a first period one of said trapped ions is in resonance and that during a subsequent second period one of fragments of said one ion is in resonance.

12. A method of scanning ions within a predetermined range of mass-to-charge ratio trapped within a trap volume with a three-dimensional quadrupole trapping field, comprising the steps of applying a supplementary AC field superposing and trapping field to *provide a combined trapping field and changing the combined trapping field to successively* eject out of said trap volume those of said ions with particular mass-to-charge ratios, *and* detecting said ions [, and thereafter changing the intensity of said trapping field].

13. The method of claim 12 wherein *the frequency of* said supplementary field is [turned on] *scanned* while the intensity of said trapping field is fixed.

14. The method of claim 12 wherein said supplementary field is turned on while the intensity of said trapping field is [varied] *scanned.*

*15. A method of mass analyzing a sample comprising the steps of*

*defining a trap volume with a three-dimensional quadrupole field adapted to trap ions within a predetermined range of mass-to-charge ratio,*

*forming or injecting ions within said trap volume such that those within said predetermined mass-to-charge range are trapped within said trap volume,*

*applying a supplementary AC field superposing said three-dimensional quadrupole field to form combined fields, and*

*scanning said combined fields to cause ions to consecutive mass-to-charge ratio to escape said trap volume for detection.*

*16. The method of claim 15 wherein the frequency of said supplementary field is scanned while the intensity of said trapping field is fixed.*

*17. The method of claim 15 wherein said supplementary field is turned on while the intensity of said trapping field is scanned.*

*18. The method of claim 17 wherein the frequency of said supplementary field is constant*

*19. A method of mass analyzing a sample comprising the steps of*

*defining a trap volume with a three-dimensional quadrupole field adapted to trap ions within a predetermined range of mass-to-charge ratio, wherein said quadrupole field is generated by an ion trap having a ring electrode and spaced end electrodes, said quadrupole field being defined by U = amplitude of a direct current voltage between said end electrodes and said ring electrode, V = magnitude of an RF voltage applied to said electrodes, and* $\omega = 2\pi \times$ frequency of said RF voltage,

*forming or injecting ions within said trap volume such that those within said predetermined mass-to-charge range are trapped within said trap volume,*

*applying a supplementary AC field superposing said three-dimensional quadrupole field to form combined fields, wherein said supplementary field is defined by* $V2$ = magnitude of an RF voltage applied between said end cap electrodes, and $\omega_2 = 2\pi \times$ frequency of said AC field, and

*controlling the combined fields by changing one or more of U, V,* $\omega$ *and* $\omega_2$ to cause said ions of consecutive mass to escape said trap volume for detection.

* * * * *